United States Patent [19]

Marino, Jr.

[11] 4,262,358
[45] Apr. 14, 1981

[54] DES PARITY CHECK SYSTEM

[75] Inventor: Joseph T. Marino, Jr., Chandler, Ariz.

[73] Assignee: Motorola, Inc., Schaumburg, Ill.

[21] Appl. No.: 53,019

[22] Filed: Jun. 28, 1979

[51] Int. Cl.³ .................................. G06F 11/10
[52] U.S. Cl. ............................................ 371/51
[58] Field of Search ........................... 371/51, 49; 364/900 MS File

[56] References Cited

U.S. PATENT DOCUMENTS

| | | | |
|---|---|---|---|
| 3,466,602 | 9/1969 | Moser et al. | 371/51 |
| 3,602,886 | 8/1971 | Carter et al. | 371/49 X |
| 4,035,766 | 7/1977 | Barker | 371/51 |
| 4,088,876 | 5/1978 | Rege | 371/51 X |

*Primary Examiner*—David H. Malzahn
*Attorney, Agent, or Firm*—M. David Shapiro; Eugene A. Parsons

[57] ABSTRACT

A system for providing on-line parity checking in data encryption/decryption systems such as DES and which is especially useful where multiple stage shifting is accomplished on a single clock input to the algorithm shift register of such a system. The parity system provides for simultaneous parity checks on a plurality of bytes where the bits of each byte are distributed through the algorithm shift register in a pseudorandom pattern.

4 Claims, 11 Drawing Figures

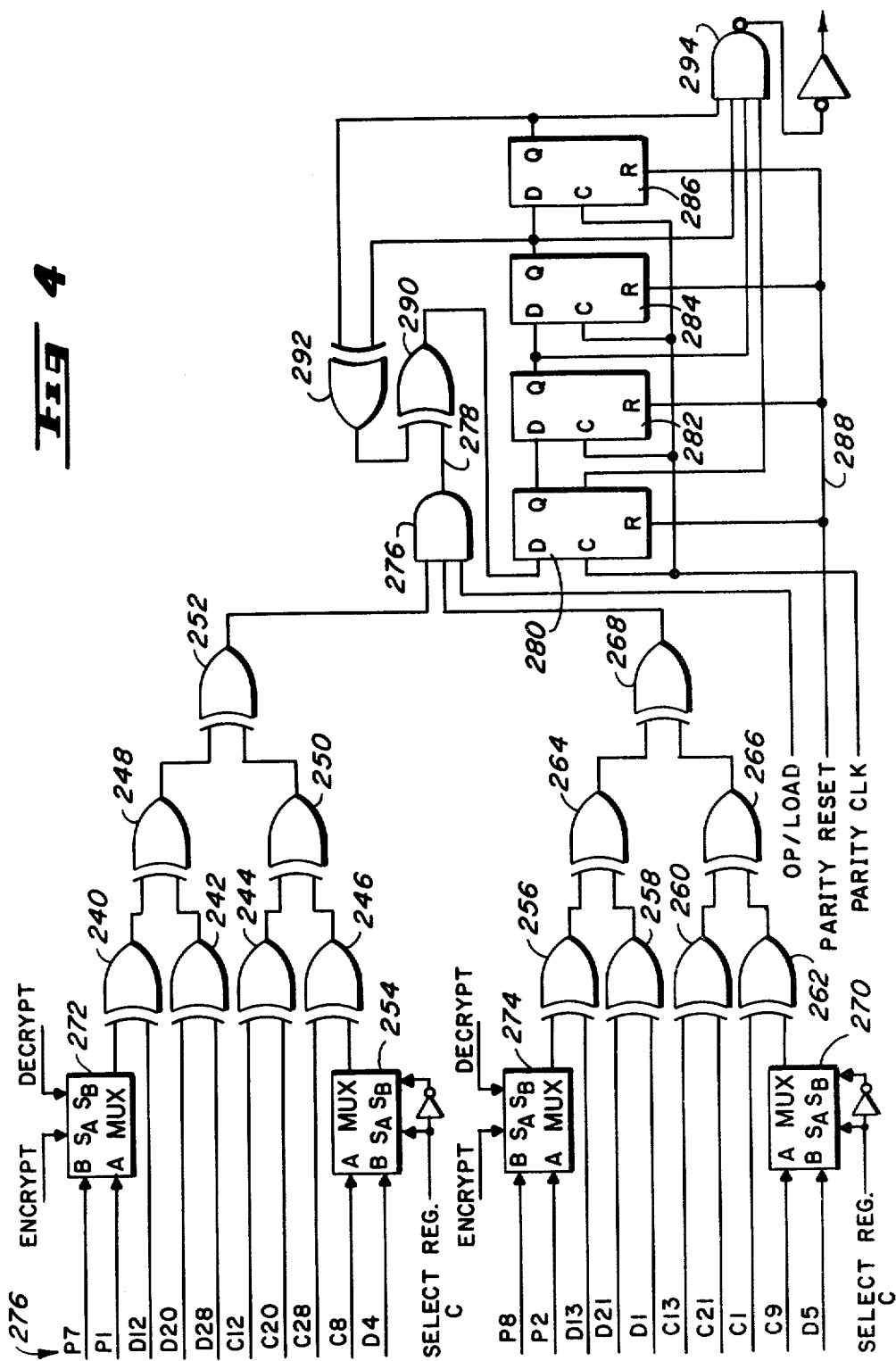

DES PARITY CHECK SYSTEM

FIELD OF THE INVENTION

The invention relates to an on-line parity checking system implemented in a segmented shift register wherein multiple stage shifts occur on a single input clock pulse.

BACKGROUND OF THE INVENTION

In a copending application by the present applicant, assigned to Motorola Inc. and identified as U.S. patent application Ser. No. 052,995, a shift register is disclosed and claimed which is capable of programmable shifts, that is; the register may be shifted on a single clock pulse input by a variable number of stage places in either direction under programmed control. The register is especially useful in implementing the Data Encryption Standard (DES) as set forth in "Federal Information Processing Standards Publication (FIPS PUB) 46", Jan. 15, 1977, National Bureau of Standards. The specific capability of the disclosed shift register allowing single or double shifts in either left or right direction allows a very high speed 16 step implementation of the FIPS PUB 46 algorithm.

It is useful in systems, such as the DES system, to perform a parity check on the variable key to ensure reliable operation. While the most straight forward approach to parity checking would be to perform the checking function before the first step of the DES algorithm, this procedure does not assure the reliability of the key during algorithm operation. The first alternative would be to check parity on-line, one eight bit byte at a time, since each byte contains parity data. But the key variable is 64 bits in length and a full parity check would comprise 8 operations; at least eight clock times. In a system such as described in the copending application, no sequence of eight consecutive single shifts is available for this purpose, but, rather, the shift sequence comprises two single, six double, one single, six double and one single shift (all either left or right), in that order.

SUMMARY OF THE INVENTION

It is therefore an object of the invention to accomplish on-line parity checking in a programmed multiple shift segmented register.

It is another object of the invention to accomplish on-line parity checking within a 16 step implementation of the DES algorithm wherein a double shift is accomplished on a single input clock pulse to the DES variable shift register.

It is still another object of the invention to provide a "parity good" output signal only in response to a predetermined number of "parity true" signals from parity trees connected to a plurality of key variable bytes which are distributed in a segmented shift register in a predetermined pattern.

These and other objects of the invention are attained by the use of a plurality of parity trees which are strategically connected and/or switched to locations in a segmented register having programmable shift capabilities. The outputs of the trees are ANDed together to feed a pseudo noise (PN) counter and parity is checked on at least two bytes simultaneously.

The invention and the objects of the invention will be better understood upon reading the Detailed Description of the Invention, below, and studying the drawings in which:

FIG. 1 is a chart showing Permuted Choice-1 according to the DES algorithm,

FIG. 2A is a chart of the permuted key variable in the C register during a 16 step ENCRYPT DES algorithm, FIG. 2B is a chart of the permuted key variable in the D register during a 16 step ENCRYPT DES algorithm, FIG. 2C is a chart of the permuted key variable in the C register during a 16 step DECRYPT DES algorithm, FIG. 2D is a chart of the permuted key variable in the D register during a 16 step DECRYPT DES algorithm, FIG. 2E is a chart of the permuted key variable in the parity register during 4 steps of a 16 step DES ENCRYPT algorithm, FIG. 2F is a chart of the permuted key variable in the parity register during 4 steps of a 16 step DES DECRYPT algorithm, FIGS. 3A and 3B are a logic diagram of the timing and control circuits of the invention, FIG. 4 is a logic diagram of the parity trees and PN parity counter of the system of the invention, and FIG. 5 is a partial logic diagram of the programmable shift register of the invention.

DETAILED DESCRIPTION OF THE INVENTION

Figure 2A:
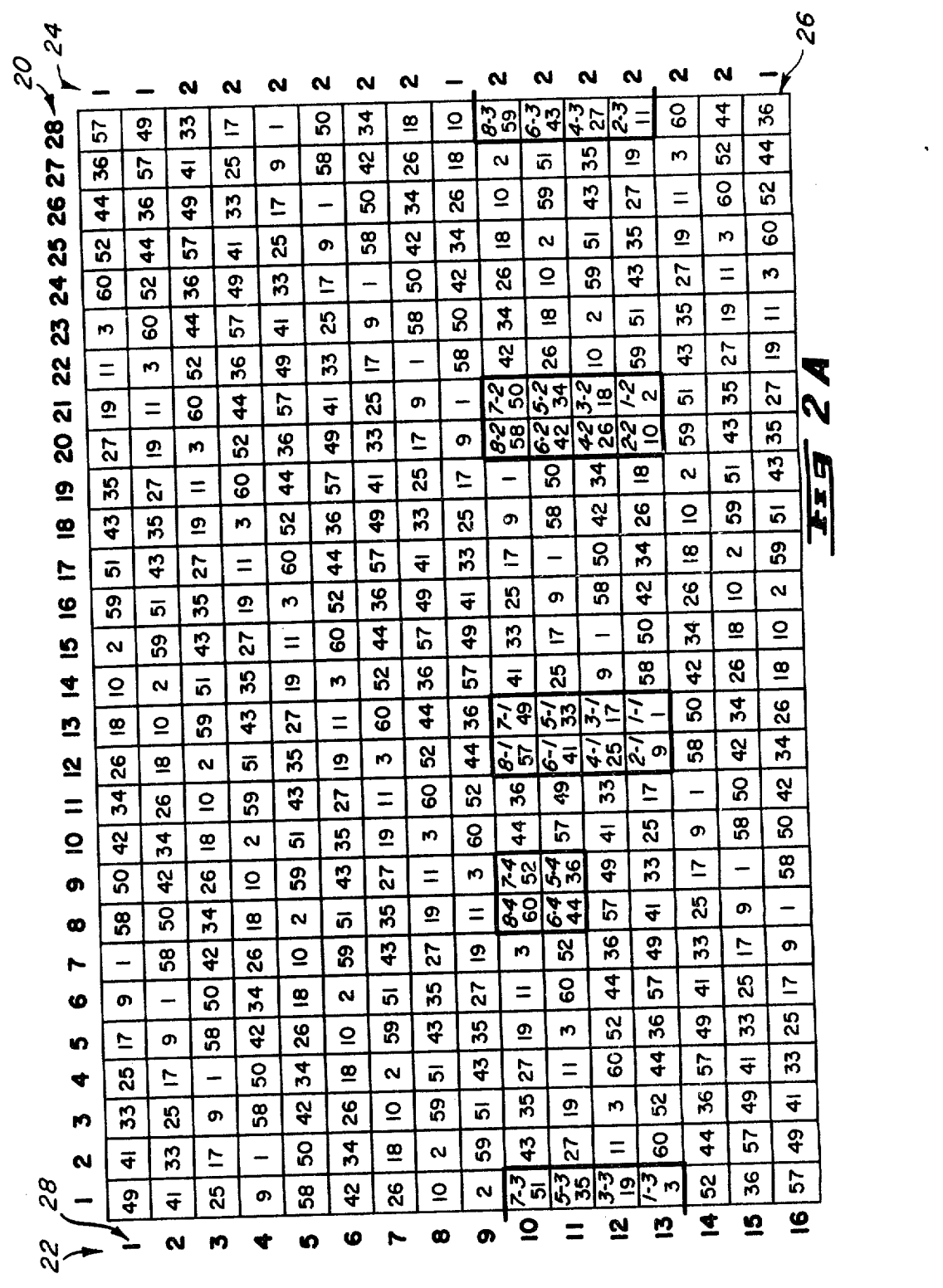
Figure 3A:
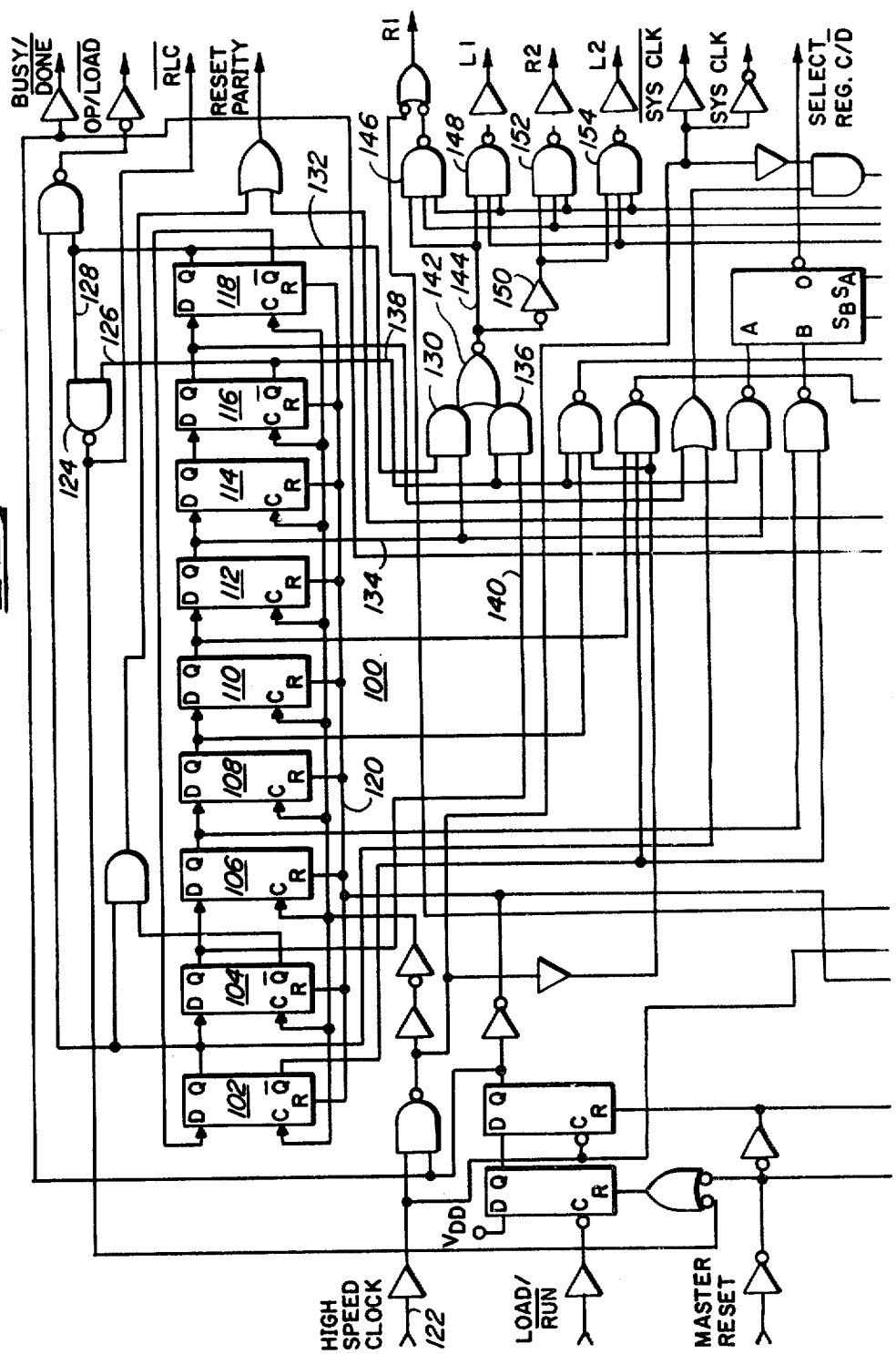

In order to better understand what follows, the reader should first study FIG. 1 which is derived from FIPS Pub. 46, data Encryption Standard, Table PC-1, page 16 of the Appendix. The table is based on a 64 bit key variable word, including 8 bits of parity. In FIG. 1 it may be seen that the 64 input variable is comprised of 8 words or bytes, 18. The first word or byte comprises bits 1, 2, 3, 4, 5, 6, 7 and 8. The eight bit of each byte is the parity bit. The columns of numbers above X1, X2, etc. represent a numeric position of each bit in the original input variable. The column marked [X8 contains the parity bits for all eight input bytes and they are stored in the parity (P) register, an 8 bit register. The columns labeled X1, X2 - - - X8 are used to permute the 64 bit word into 2 28 bit words plus an 8 bit parity byte. Beginning at the left of the 64 bit input variable, bit 1 of byte 1 is identified as the last bit of byte X1, a portion of the permuted word. Bit 57 of the input variable is the first bit of byte X1, the first byte of the permuted word. As may be seen from the DES, the first 28 bits of the permuted word are made up of the bits of byte columns X1, X2, X3 and the first 4 bits of X4. These bits are ordered vertically from the top down so that the first 8 bits of the 28 bit word in th C register comprise bits 57, 49, 41, 33, 25, 17, 9 and 1, the second 8 bits are represented by the bits 58, 50, 42, 34, 26, 18, 10 and 2, the third 8 bits are represented by the bits 59, 51, 43, 35, 27, 19, 11 and 3 and the last 4 bits are 60, 52, 44 and 36. The D register is similarly made up of the 28 bits comprising bytes X7, X6 and X5, in that order, plus the last 4 bits of X4. The organization of bits in the C register may be seen in its entirety in FIG. 2A, (step 16) a chart of the ENCRYPT algorithm for the C register. (Similarly, the D register bits for the ENCRYPT algorithm appear in step 16 of FIG. 2B.) Specifically FIG. 2A is organized to show the C register bit number, reference numeral 20, the algorithm accomplished between algorithm steps are shown at reference numeral 24. The representation of the C register, before algorithm step 1, is shown as algorithm step 16, reference numeral 26 (and the D register organization at that same time is shown at algorithm step 16, FIG. 2B). That is, the bit numbers shown at reference numeral 26, (57, 49, 41, ...36) are the first 28 bits of the permuted word from the DES. Step 1, reference numeral 28, shows the same bits shifted on place to the left as they would be after the first algorithm step of the 16 step ENCRYPT algorithm. Since the C register is connected in an end around arrangement, data bit 57 which appears at the left end of the 16th step of the ENCRYPT algorithm appears at the right end of the first step of the 16 step ENCRYPT algorithm. At step 2 of the algorithm it will be noted that bit 57 has shifted one more place to the left, this being consistent with the number of shift places indicated at reference numeral 24, to the right of FIG. 2A. In the third step in the ENCRYPT algorithm, bit 57 has shifted 2 more places to the left as indicated. Of course, all the other bits of the 28 bit word have also shifted to the left by a like number of places. The shift pattern continues, according to the column of shift register numbers, 24, and each step of the algorithm at reference numeral 22. The shift pattern is that pattern required by the DES and is shown in the vertical column at reference numeral 24. Specifically the shift pattern for encryption is as follows: a single left shift, a single left shift, a double left shift, a double left shift, a double left shift, a double left shift, a double left shift, a double left shift, a single left shift, a double left shift, a double left shift, a double left shift, a double left shift, a double left shift, a double left shift and a single left shift, all shown in the column at reference numeral 24.

Figure 2B:
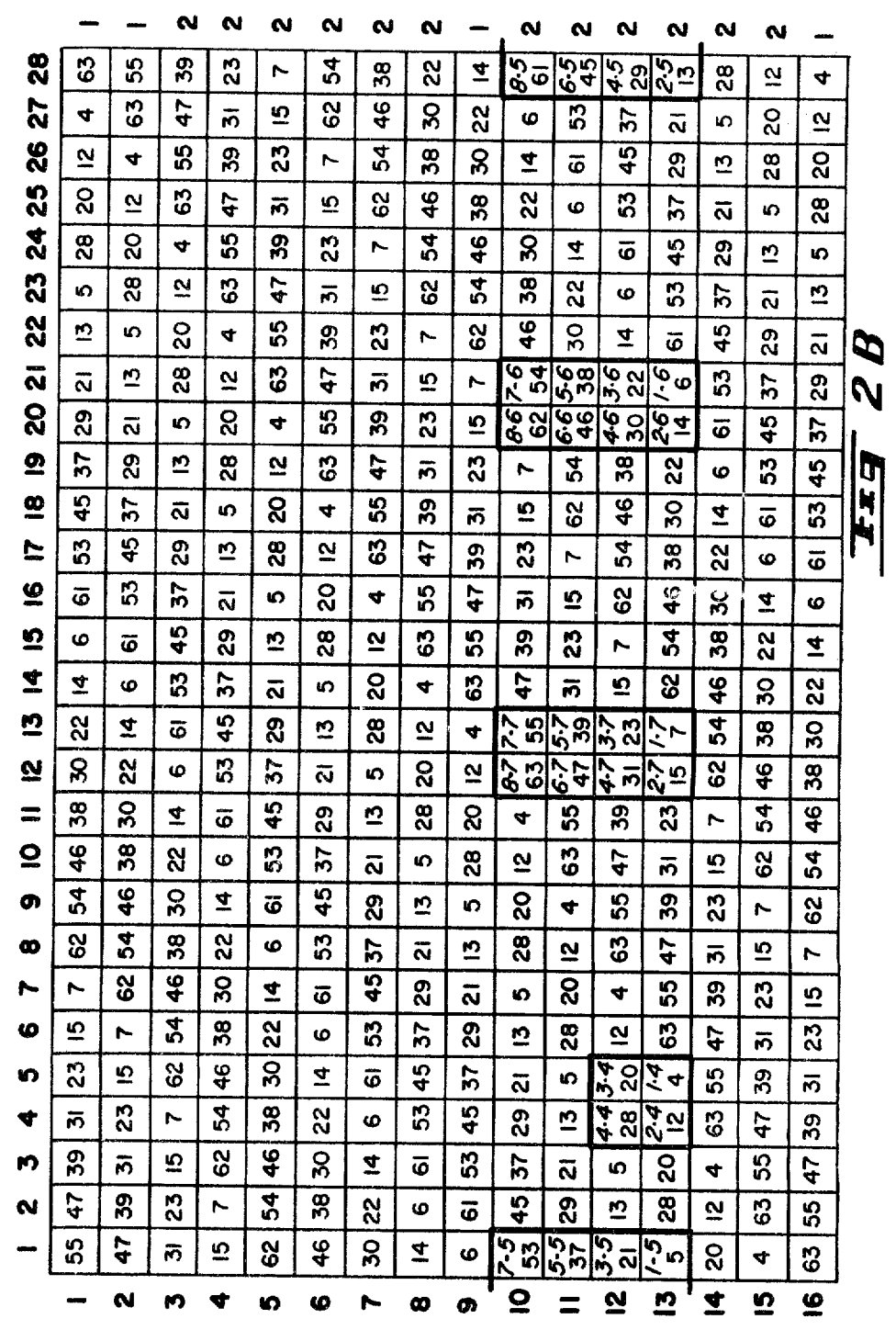
Figure 2C:
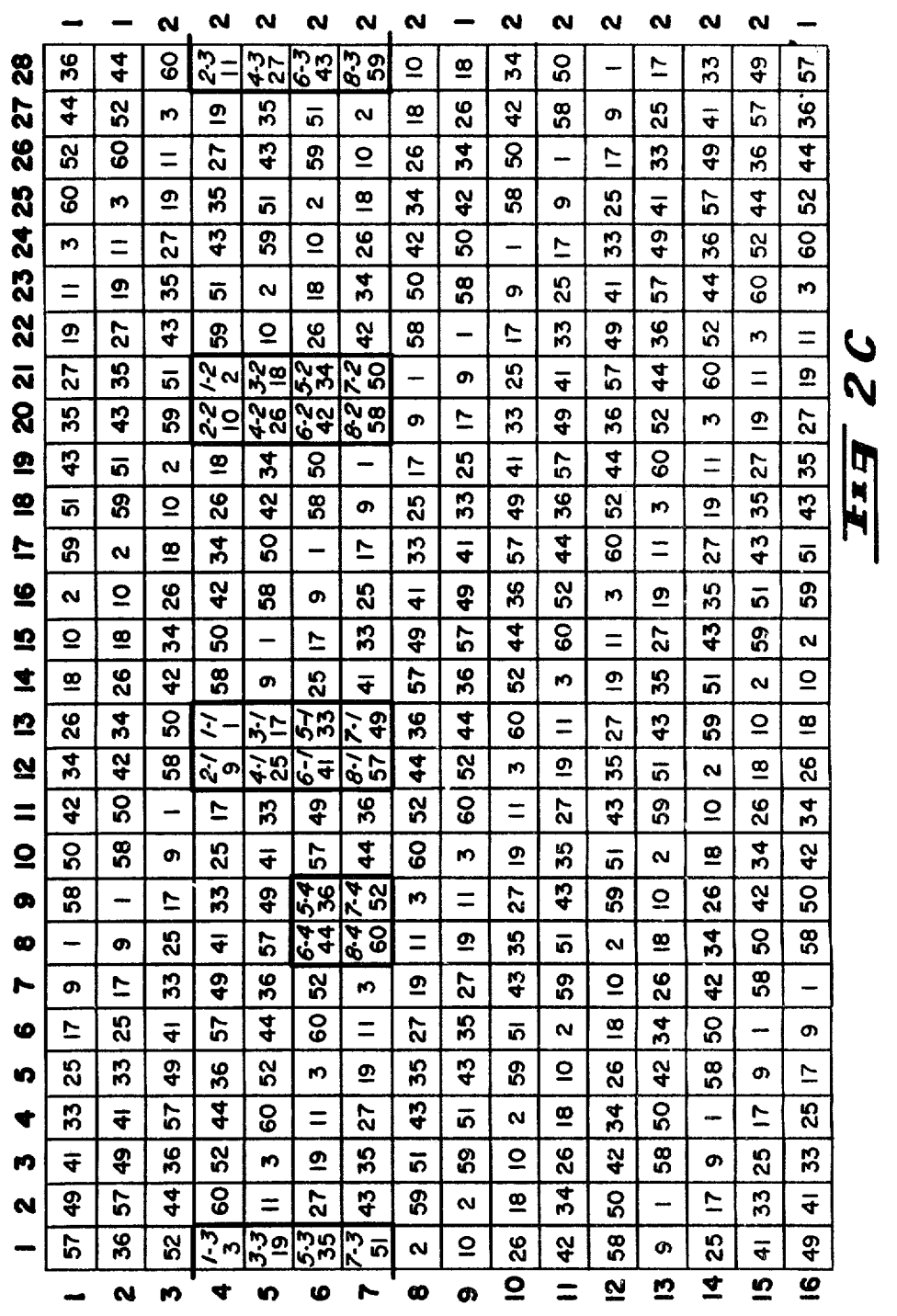
Figure 2D:
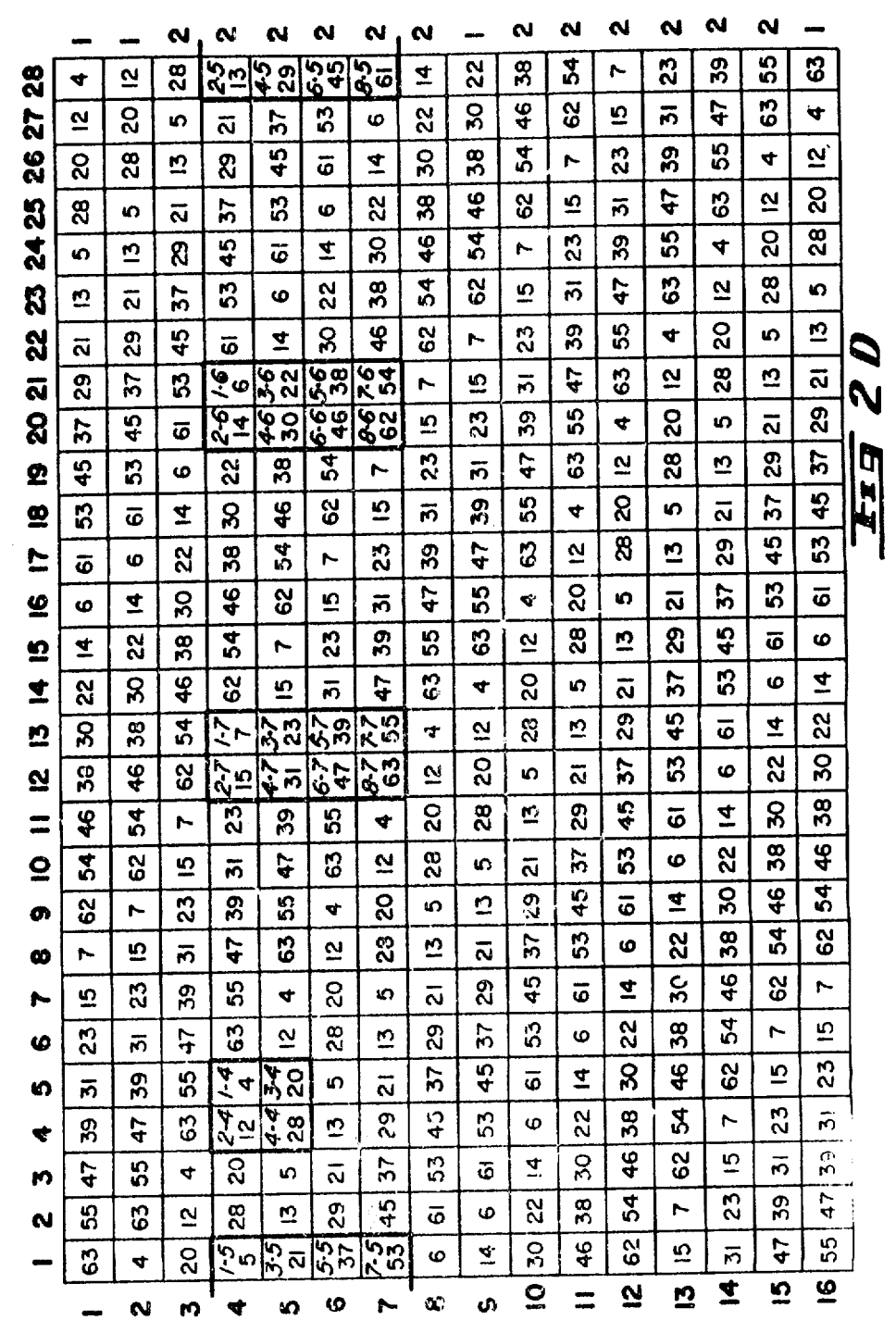

Notice in FIG. 2A that certain bits of algorithm steps 10, 11, 12, and 13 have been emphasized by enclosure in heavy lined blocks. Within the heavy blocks, and throughout the rest of FIG. 2A, the bit numbers of the input variable are not italicized. But within the blocks of algorithm steps 10, 11, 12 and 13 there also appear italicized pairs of numbers. The first digit of each pair represents the input byte number of the input variable. The second digit of the italized pair represents the bit number of that byte. Therefore it will be understood that at the left end of algorithm step 10 of the ENCRYPT algorithm (FIG. 2A) the italicized number pair, 7:3, means that bit 51 of the input variable is the third bit of the seventh byte. Furthermore it sould be understood that this bit is read with all other such emphasized bits, such as those in the last block of algorithm step 10 wherein the italicized pair 8-3 appears together with the unitalicized 59. (This means that 59 is the third bit of the eighth input byte.) This illustrative example is typical of the charts of FIGS. 2A, B, C, D, E and F. FIGS. 2A and 2B represent the ENCRYPT charts for registers C and D, respectively, wherein all shifts are to the left, FIGS. 2C and 2D represent the DECRYPT charts for register C and D, respectively, wherein all shifts are to the right, and FIGS. 2E and 2F represent the parity registers for ENCRYPT and DECRYPT, respectively, ENCRYPT shifts being double left shifts and DECRYPT shifts being double right shifts.

According to the best mode of the invention, parity is checked during the 16 step algorithm on 2 bytes at a time. For ENCRYPT mode, bytes 7 and 8 are checked at algorithm step 10, 5 and 6 at step 11, 3 and 4 at step 12 and 1 and 2 at step 13. For DECRYPT mode, bytes 1 and 2 are checked at algorithm step 4, 3 and 4 at step 5, 5 and 6 at step 6 and 7 and 8 at step 7. For example, considering FIG. 2A, at step 10 of the algorithm it may be seen that words or bytes 7 and 8 are being checked as indicated by their enclosure within the emphasized box areas. Byte 7 comprises bits 49, 50, 51, 52 and in FIG. 2B, 53, 54, 55, and the parity bit, the eight bit, 56, which appears in FIG. 2E at step 1, see reference numeral 200.

Figure 3B:
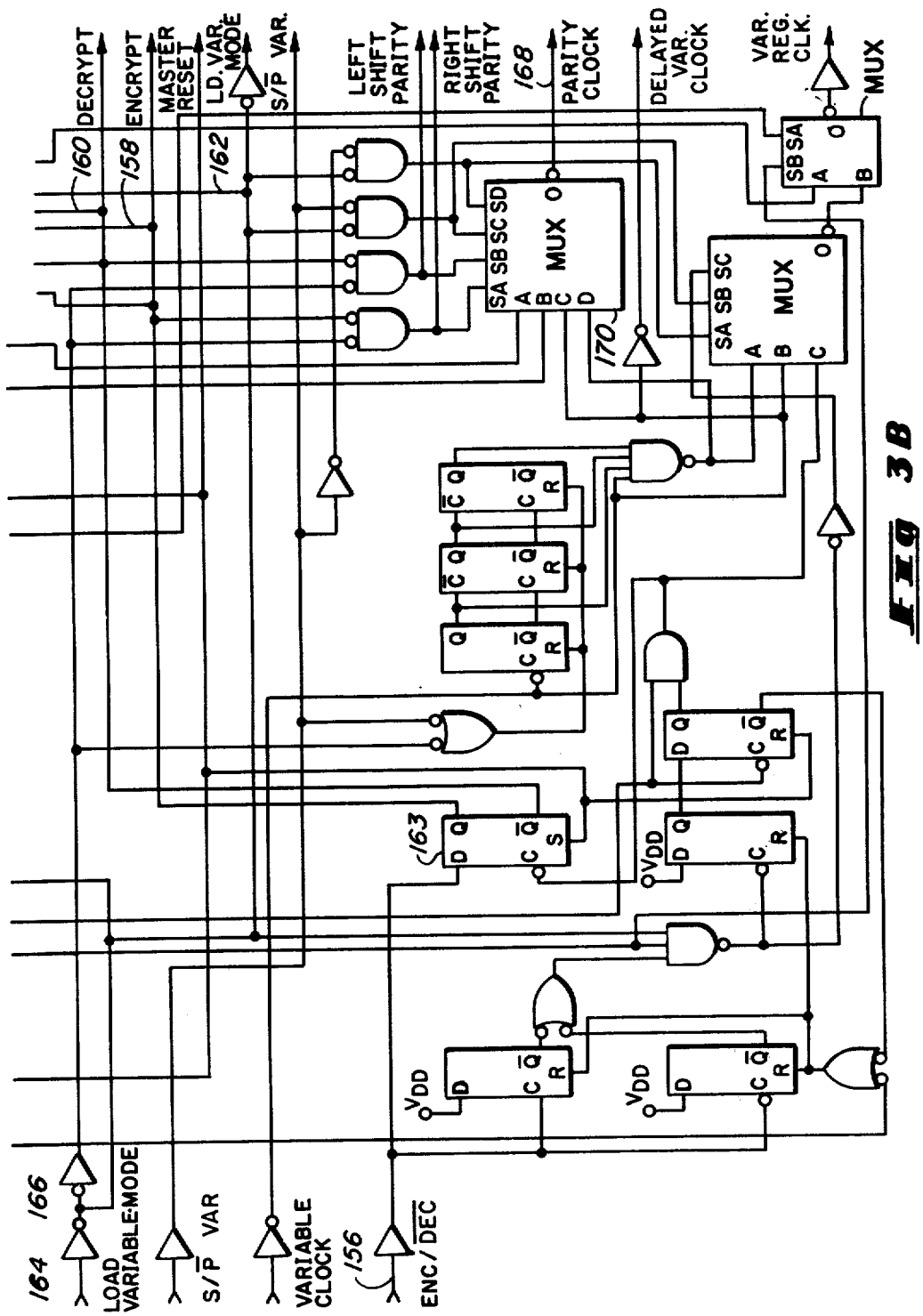
Figure 5:
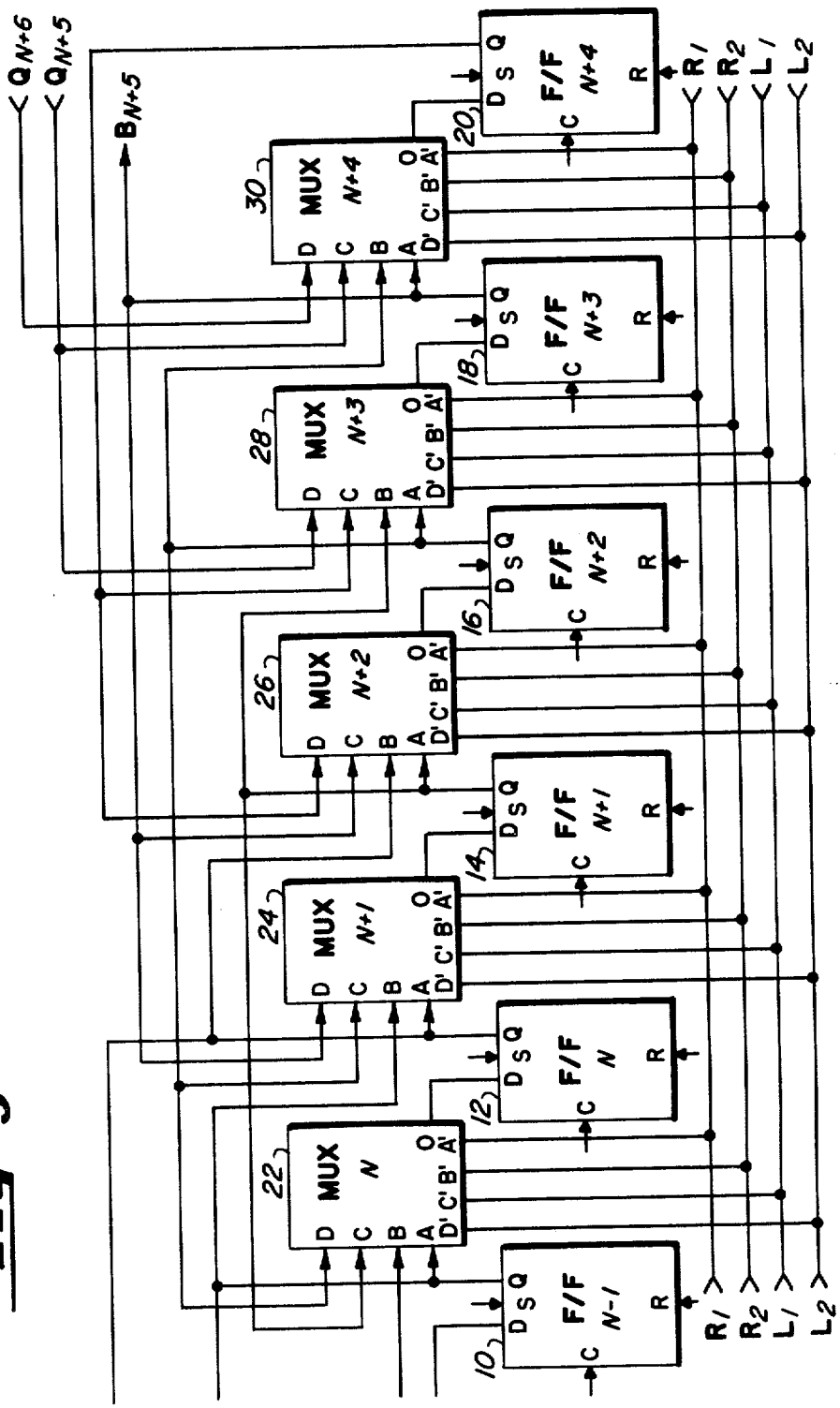

Similarly, byte or word 8 may be traced through the C and D registers at algorithm step 10 and in the parity register at parity step 1. These comprise bits 57, 58, 59, 60, 61, 62, 63 and 64. Consideration of the charts of FIG. 2A, 2B and 2E will show that parity may be checked by sensing the values of the bits in bit positions 1, 8, 9, 12, 13, 20, 21 and 28 of the C register, as shown in FIG. 2A; and bits 1, 4, 5, 12, 13, 20, 21 and 28 of the D register as shown in FIG. 2B; together with bits 1 and 2 of the parity register as shown in FIG. 2E. Notice that the bits to be sensed occur in pairs. That is, the first bit of the seventh word or byte and the first bit of the eighth word or byte appear together in bit positions 12 and 13 of the 10th step of the C register, see FIG. 2A. Similarly the bits for bytes numbered 5 and 6, 3 and 4, and 1 and 2 appear at the same parity sense locations during steps 11, 12 and 13, respectively. The parity bits associated with each of these words also appear at the sensed positions 1 and 2 of the parity register (see FIG. 2E) during steps 2, 3 and 4 of the parity register shift cycle. It should be understood that parity register shift step 1 coincides with shift step 10 in the C and D registers, step 2 of the parity register coincides with step 11 of the C and D register and so forth. Parity clock output (FIG. 3B) assures this synchronism. Note that all bits of all 8 words appear in bit positions 1, 12, 13, 20, 21, and 28 of each of the C and D registers except for those bits which occur in bit positions 8 and 9 of the C register (see FIG. 2A) and bits which occur in bit positions 4 and 5 of the D register (see FIG. 2B). This anomaly must be taken in consideration and the solution to it will be explained in the description which follows.

FIG. 4 is a logic diagram of the parity checking mechanism of the invention. The parity tree comprising exclusive OR gates 240, 242, 244, 246, 248, 250, and 252 are utilized to check the odd number bytes in registers C, D and the parity register. Mux 254 supplies the necessary different bit positions between steps 10-11 of the algorithm and steps 12-13 of the algorithm. During steps 10 and 11, "select register C" is utilized to enable the A input, via SA, to mux 254 allowing the signal from the eighth bit of the C register to be sensed. During steps 12 and 13 of the algorithm the input to EXCLUSIVE OR gate 246 is switched by MUX 254 to the B input and the fourth bit of register D is sensed instead. It will be seen from FIGS. 2E (ENCRYPT) and 2F (DECRYPT) that the parity bits must be selected from bit numbers 1 and 2 for encryption and bits 7 and 8 for decryption as shown in the emphasized boxes. MUX 272 accomplishes this shift for the odd numbered bytes and MUX 274 does the same for even numbered bytes. It should be noted that the combination alphabetic numeric designations 276 at the left side of FIG. 4 indicate first; the register designation ("P" for parity and "C" and "D" for the C and D registers) and the bit number within that register. It will be understood then, that "P7" means that connection is made to the seventh bit of the P register, and "P1" is a connection made to the first bit of P register. Similarly D12 means the connection is to the 12th bit of the D register and so forth. The output of the parity trees are ANDed in AND gate 276. This produces the parity bit signal at 278.

Flip-flops 280, 282, 284 and 286 comprise a PN counter. This counter is reset by the parity reset signal on line 288 so that the parity count register is always reset to zero. EXCLUSIVE OR gates 290 and 292 are used to feed back signals from the Q (true) outputs of flip-flops 284 and 286 and the parity bit to the input of flip-flop 280. Since parity is checked throughout the system during 4 sequential algorithm steps, it is expected that 4 good parity bits will appear sequentially at point 278. AND gate 294 is arranged to provide an output on the 4th state of the PN counter, that is; when the four flip-flops 280, 282, 284 and 286 ar in the 0111 state. It is important to note that a failure of the PN counter will cause a false output indicating that the parity is not good. This makes the system fail safe in this respect.

Parity check in the DECRYPT algorithm cycle is similar to that just explained for an ENCRYPT cycle with limited exceptions; first, the parity check is accomplished, as will be seen from a study of FIGS. 2C and 2D, during algorithm steps 4, 5, 6 and 7 instead of during algorithm steps 10, 11, 12 and 13 as was the case for ENCRYPT. Second, the bit inputs to the parity trees must be shifted from bits 4 and 5 of the D register to bits 8 and 9 of the C register between the fifth and sixth algorithm steps. Third, parity bits to be sensed in the parity register must be sensed in bit places 7 and 8 instead of bit places 1 and 2 as may be seen from FIG. 2F and parity register shift steps 1-4 coincide with C and D register shift steps 4-7, respectively. It will also be seen from study of FIG. 2E, the ENCRYPT parity register chart, and FIG. 2F, the DECRYPT parity register chart, that shifting within the parity register is to the left for encryption and to the right for decryption. In each case the shift is two places, four times. These parity shifts are accomplished by means of parity clock 168 (see FIG. 3B). MUX 170 selects the proper time for the parity clocks and direction of the shift is controlled by the outputs of AND gates 152 and 154 (see FIG. 3A). And of course, the single and double shifts in the C, D and P registers are all to the right rather than to the left.

It may be seen, then, that by utilizing the ENCRYPT algorithm double left shift steps 10-13 or the DECRYPT algorithm double right shift steps 4-7 together with four coincident shift steps in the parity register, parity is checked on-line, 2 bytes at a time, during 4 successive double shift steps of the C, D and parity registers. There is no cost, in terms of system speed, incurred in the parity check and the total algorithm is accomplished in 16 steps at the maximum clock speed of the shift register. Of course, other shift steps and parity tree sensing points could be selected as these may be a designer's choice.

While the invention has been particularly shown and described with reference to a preferred embodiment thereof it will be understood by those skilled in the art that various other modifications and changes may be made to the present invention from the principles of the invention described above without departing from the spirit and scope thereof as encompassed in the accompanying claims. Therefore it is intended in the appended claims to cover all such equivalent variations as may come within the scope of the invention as described.

I claim:

1. A parity checking system for a plurality of input data bytes, each of said plurality of bytes comprising a plurality of bits capable of having parity, the combination comprising:

segmented shift register for storing and shifting the plurality of bytes in a predetermined pseudo-random pattern; and a pluraity of tree means for checking parity of at least two of this plurality of bytes in said segmented shift register means in a single clock time frame, each of said tree means having input connections to said segmented shift register means according to a connection pattern, said connection pattern being cooperative with said predetermined pseudo-random byte shift pattern in said segmented shift register means.

2. The parity checking system according to claim 1 wherein the segmented shift register means is arranged to provide a series of multiple place shifts being equal in number to at least two shift places and wherein said plurality of tree means is equal in number to said number of shift places of said at least two shift places.

3. The parity checking system according to claim 2 wherein said series of multiple place shifts are equal to two and said number of said number of said plurality of tree means is equal to two.

4. The parity checking system according to claim 2 or 3 further comprising:

means for outputting a sequential series of parity true signals, each of said series of parity true signals being responsive to a successful parity check of at least two bytes of said input data bytes by said plurality of tree means;

means for counting said sequential series of parity true signals from said outputting means; and means for sensing a predetermined count of said counting means within a predetermined time period and for indicating that all of said input data bytes have good parity during said predetermined time period.

* * * * *